US 6,623,792 B2

(12) United States Patent
Akimori

(10) Patent No.: US 6,623,792 B2
(45) Date of Patent: Sep. 23, 2003

(54) METHOD FOR PRODUCING OPTICAL RECORDING MEDIUM

(75) Inventor: Toshihiro Akimori, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/780,797

(22) Filed: Feb. 9, 2001

(65) Prior Publication Data
US 2001/0053409 A1 Dec. 20, 2001

(30) Foreign Application Priority Data

Feb. 14, 2000 (JP) .................................. 2000-039798

(51) Int. Cl.⁷ .............................. G11B 3/70; G11B 7/24; B05D 1/38; C23C 14/34; C23C 14/56

(52) U.S. Cl. ..................... 427/162; 427/384; 427/402; 427/425; 427/240; 369/275.1; 369/275.4; 369/275.5; 369/283; 204/192.1; 204/192.27

(58) Field of Search ................... 427/162, 377, 427/404, 405, 425, 444, 8, 240, 407.1, 409, 164, 384, 402; 369/275.1, 275.4, 275.5, 288, 283, 277; 118/663, 504, 708; 204/192.1, 192.27

(56) References Cited

U.S. PATENT DOCUMENTS

| 5,478,701 A | * 12/1995 | Jung | 430/321 |
| 5,639,588 A | * 6/1997 | Huh | 430/270.15 |
| 5,912,061 A | * 6/1999 | Uchida et al. | 428/64.3 |
| 5,966,369 A | * 10/1999 | Walters et al. | 369/286 |

FOREIGN PATENT DOCUMENTS

| JP | 05-047052 A | * | 2/1993 |
| JP | 06-150371 A | * | 5/1994 |
| JP | 09-001934 A | * | 1/1997 |
| JP | 11-006636 A | * | 1/1999 |

* cited by examiner

Primary Examiner—Shrive P. Beck
Assistant Examiner—Wesley Markham
(74) Attorney, Agent, or Firm—Sonnenschein, Nath & Rosenthal LLP

(57) ABSTRACT

This invention provides a method for producing a CD-R optical recording medium. A first stack at a first stage is created by forming on a substrate a recording layer containing an organic dyestuff and a metal layer. At least after a formation of the metal layer, the first stack is transported from the first stage along a transport path towards a second stage through an atmosphere having a relative humidity. The relative humidity is maintained at 40% or less. To control the relative humidity, a shielding plate may be provided around the transport path. An air conditioner may locally control the relative humidity of an area encircled by this shielding plate.

5 Claims, 3 Drawing Sheets

METHOD FOR PRODUCING OPTICAL RECORDING MEDIUM

RELATED APPLICATION DATA

The present application claims priority to Japanese Application No. P2000-039798 filed Feb. 14, 2000, which application is incorporated herein by reference to the extent permitted by law.

BACKGROUND OF THE INVENTION

1. Field of the Invention

This invention relates to a method for producing an optical recording medium having an organic dyestuff as a recording material.

2. Description of Related Art

An optical recording medium having an organic dyestuff as a recording material includes a recording layer mainly composed of an organic dyestuff on a transparent substrate, such as plastics. The information is recorded by scanning the laser light collected on the surface of this recording layer. Specifically, the information is recorded by forming pits on the surface of the recording layer irradiated with the laser light and the information written is read out by exploiting changes in reflectance caused by the information recording.

In the optical recording medium with organic dyestuff, it is a routine practice to form a reflective layer in superposition on the recording layer, with a view to realization of reflectance. So, a recording layer, a reflective layer and a protective layer are usually formed in this order to constitute a medium configuration.

Meanwhile, a high density optical recording medium is mostly used for information backup, so that it is retained to be necessary to keep the stability of reproduction characteristics for an extended period of time. The organic dye-based optical recording medium is not an exception. In general, a guaranteed period on the order of ten years is demanded of the organic dye-based optical recording medium.

Thus, storage reliability is thought to be crucial in an optical recording medium and hence is to be checked at the outset in view of guaranteeing the product quality.

However, storage tests on the order of one year are in reality not possible so that the usual practice is to effect storage under high temperature and high humidity conditions as an acceleration test as substitution measures to evaluate signal characteristics periodically.

The demanded characteristic is that signal characteristics after storage under high temperature and high humidity atmosphere for hundreds of hours be equivalent to those prior to storage.

If evaluation of this storage stability is made, in case of a CD-R as a representative organic dye-based optical recording medium, increasing error occurrence is noticed, in many cases, if the recording medium is stored for a prolonged time under high temperature and high humidity conditions.

For accomplishing the above object, the present invention takes into account that the humidity of the atmosphere to which the metal layer such as the reflective layer is subjected represents a strong influencing factor.

Since increasing error occurrence imperils the reliability in playback characteristics, it is crucial in improving the quality of the organic dye-based optical recording medium to decrease error occurrence on storage under high temperature and high humidity conditions.

Reproduction stability under high temperature and high humidity conditions is a desideratum for the totality of sorts of the optical recording mediums. However, the reproduction stability is not improved in the case of the organic dye-based optical recording medium so appreciably as in the case of a magneto-optical recording medium. One of the reasons is that it cannot be distinguished whether the increase in errors in reproduction is ascribable to the deterioration of the recording layer or to that of the reflective layer. So, it cannot be grasped which production step in the production process is to be improved for utmost effect, to render it impossible to take practical measures.

SUMMARY OF THE INVENTION

It is therefore an object of the present invention to provide a method for producing an organic dye-based optical recording medium superior in storage reliability.

For accomplishing the above object, the present inventor has conducted patient research and arrived at a conclusion that the humidity of the atmosphere to which the metal layer such as the reflective layer is subjected represents a strong influencing factor.

The present invention, completed based on this finding, resides in a method for producing an optical recording medium having a recording layer containing an organic dyestuff and a metal layer on a substrate, wherein the atmosphere of a transport path for transport to the next stage at least after formation of said metal layer is set to the relative humidity of 40% or less.

If the metal layer formed is exposed to a high humidity atmosphere, the number of times of errors increases with the storage time. If conversely the atmosphere is controlled to the relative humidity of 40% or less, the number of times of errors is scarcely noticed even after prolonged storage.

If the relative humidity of the atmosphere on the transport path 15 following the formation of the metal layer (reflective layer) is set to 40% or less to prevent the metal layer from being exposed to a high humidity atmosphere, playback signal characteristics in the organic dye-based optical recording medium can be maintained for a prolonged time to improve the storage reliability appreciably.

In this manner, the storage reliability of the organic dye-based optical recording medium, retained to be inferior to those of the magneto-optical recording medium, can be improved significantly and maintained in stability.

DESCRIPTION OF THE PREFERRED EMBODIMENTS

Figure 1:
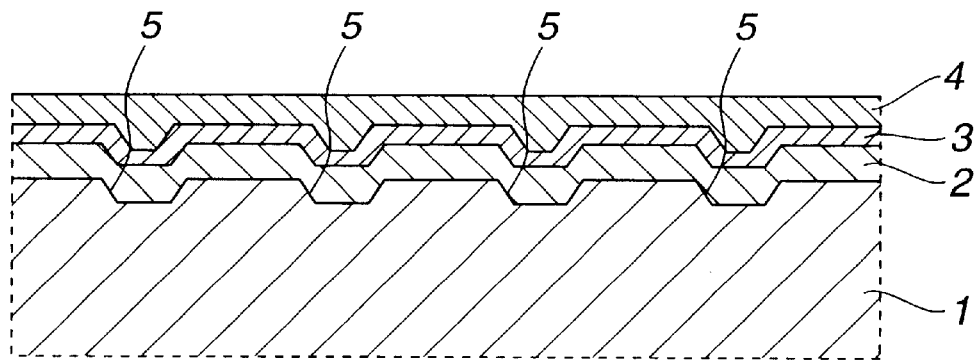
FIG. 1 is a schematic cross-sectional view showing essential portions of accompaniment illustrative structure of an organic dye-based optical recording medium.

Referring to the drawings, preferred embodiments of a method for producing an organic dye-based optical recording medium according to the present invention will be explained in detail. Although a so-called CD-R (Compact Disk-Recordable) is explained hereinbelow as an example, the present invention may, of course, be applied to the preparation of the organic dye-based optical recording medium in general without being limited to the production of the CD-R.

FIG. 1 shows an illustrative structure of an organic dye-based optical recording medium to which a manufacturing method of the present invention is applied.

The recording medium based on the organic dye shown in FIG. 1 is a so-called CD-R including a disc substrate 1 molded to a disc shape approximately 120 mm in diameter and approximately 1.2 mm in thickness from a transparent resin material such as polymethyl methacrylate (PMMA) or polycarbonate (PC). On this disc substrate 1 is formed the recording layer 2 by spin-coating an organic dye-based recording material. On the recording layer 2 is also formed a reflective film 3 from gold (Au), gold alloys, silver (Ag), or silver alloys.

The reflective film 3 may be formed on the recording layer 2 directly or with the interposition of a suitable underlying layer.

In this CD-R, an annular area from the center of the disc substrate 1 about 50 to 116 mm as a diameter is set as an information recording area. At least in this region, a wobbling groove as a meandering guide groove is formed e.g., as a spiral groove. The portion of the recording layer 2 in register with the wobbling groove 5 is set as a recording track. In this recording track is recorded an EFM-modulated signal (EFM signal).

The wobbling groove 5 is adapted for wobbling at a pre-set period. By this wobbling, the sector information including the FM-modulated absolute time information is recorded as ATIP (absolute time in pre-groove) wobbling signal.

In the above-described CD-R, the EFM signals are recorded on a recording track as changes in reflectance of the recording material based on the organic dye making up the recording layer 2.

In producing the above-described optical recording medium, the recording layer 2, reflective film 3 and the protective layer 4 need to be deposited sequentially on the substrate 1. These steps are carried out continuously via a transporting system, as shown for example in FIGS. 2 and 3.

Figure 2:
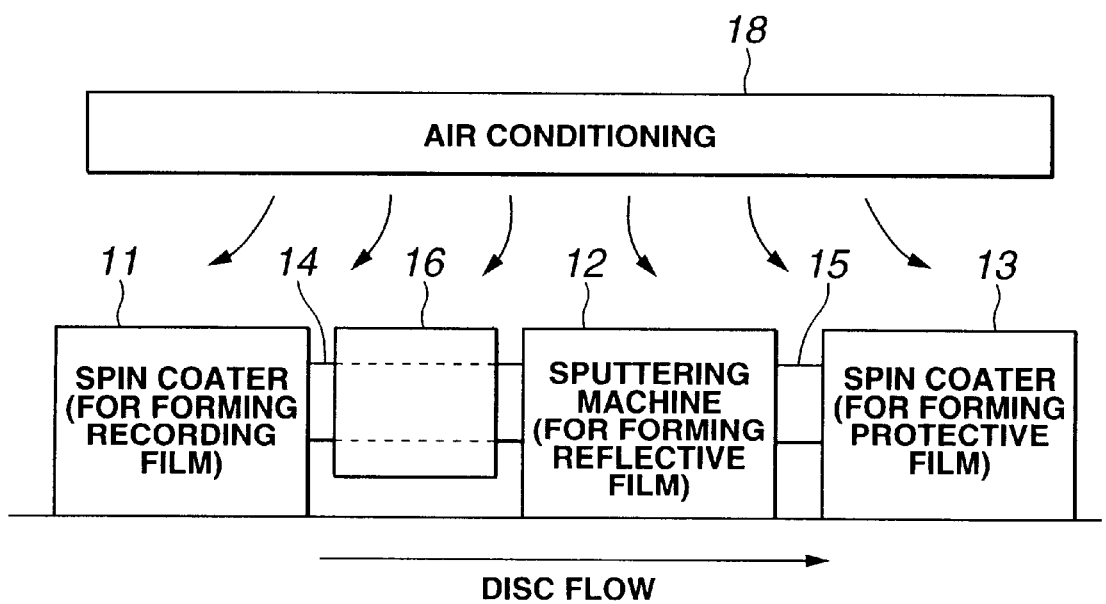
FIG. 2 is a schematic side view showing an arraying state of a production line of an organic dye-based optical recording medium.
Figure 3:
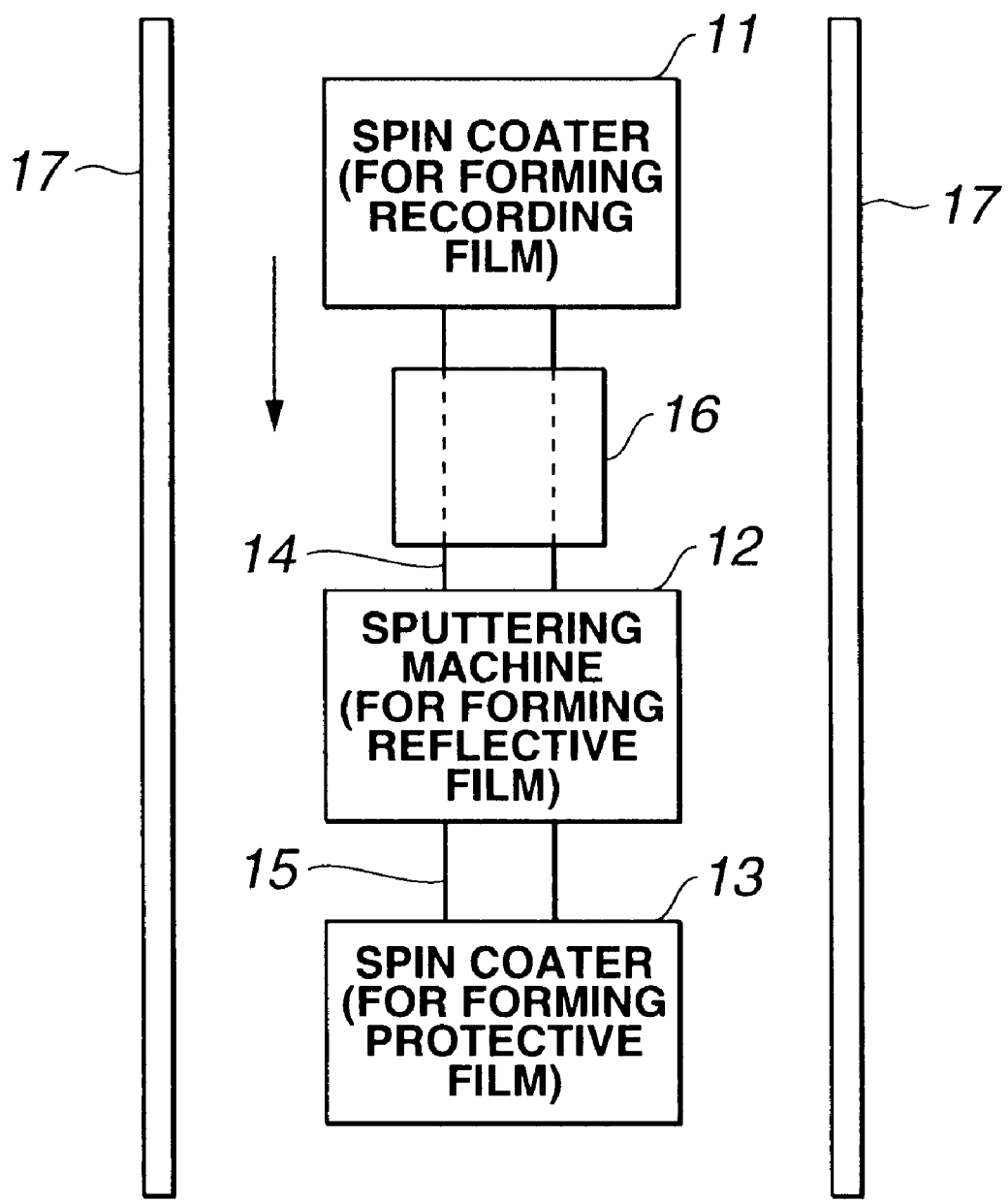
FIG. 3 is a schematic view showing a plane arraying state of a production line of an organic dye-based optical recording medium.

In the production process, shown in FIGS. 2 and 3, a spin coater 11 for forming the recording layer 2, a sputtering device 12 for depositing the reflective film 3, and a spin coater 13 for forming the protective layer 4 are arranged in a line and interconnected by disc transport paths 14, 15.

The transport path 14 immediately transfers the disc substrate, coated with the recording layer 2 in the spin coater 11, to the sputtering device 12 where the reflective film 3 is formed. The disc substrate 1, now carrying the reflective film 3, is transferred on the transport path 15 to the spin coater 13 where the protective layer 4 is spin-coated thereon. Between the spin coater 11, adapted for forming the recording film 2, and the sputtering device 12, there is provided an oven 16 where the recording layer 2 formed is dried and thence supplied to the sputtering device 12 for depositing the reflective film 3. The oven 16, routinely provided in the normal production process, may occasionally be omitted.

If, in the above-described production process, the moisture is deposited on an exposed film, formed on the sputtering device 12, it tends to cause corrosion to lower the long-term reliability appreciably.

Thus, according to the present invention, the relative humidity in the atmosphere on the transport path 15 between the sputtering device 12 and the spin coater 13 is controlled to be not higher than 40% in order to evade such inconvenience.

The relative humidity can be adjusted by, for example, adjusting an air conditioner. At this time, a clean room, in which is mounted the production apparatus adapted for executing the above-described sequence of operations, is air-conditioned in its entirety, or only the transport domain is controlled in humidity in view of ease in control or with a view to reducing the running cost.

In the present embodiment, a shielding plate 17 of, for example, acrylic resin, is provided along the transport path 15 to control the humidity of the vicinity of the transport path 15 by downward air flow from an air conditioner 18.

By controlling the relative humidity of the atmosphere on the transport path 15 between the sputtering device 12 and the spin coater 13 to 40% or less, it is possible to suppress the occurrence of corrosion to render it possible to produce a recording medium based on the organic dye exhibiting superior reproducing characteristics even after prolonged storage.

Embodiment

In the following, specified experimental results of the present invention are explained.

The measurement of sample errors, according to different humidity levels in the production process have been conducted and comparison made of the measured results. The production process is comprised mainly of three steps, namely a recording layer forming step, a reflective film forming step and a protective layer forming step. The temperature and humidity atmospheres in the respective steps are fixed, and the humidity in the transporting step following the deposition of the reflective film 3 was changed.

The process conditions in the present embodiment were as follows:

First, the coating atmosphere and the relative humidity were controlled to be 25° C. and 35%, respectively, and a recording layer was coated by a spin coater to a thickness of 1.2 mm and a diameter of 120 mm. As substrate, a substrate of injection-molded polycarbonate resin, having a spirally-shaped guide groove, was used. The recording layer was formed by dissolving 1-butyl-2-[5-(1-butyl-3,3-dimethyl benz[e]indolin-2-ylidene)-1,3-pentadienyl]-3,3-dimethyl-1H-benz[e] indolinium, shown by the chemical formula 1:

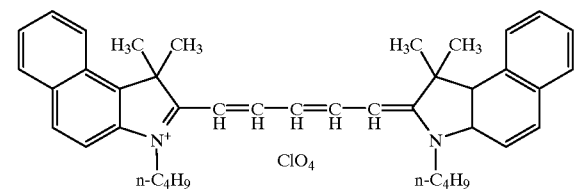

as a dyestuff, dissolved in an organic solvent, and spin-coating the resulting solution on a surface of the substrate carrying the guide groove.

The reflecting film then was deposited by sputtering and the atmosphere of the transport path adapted for transferring the film to the next step of forming the protective film was set to values of the relative humidity of 35%, 40%, 50% and to 100%, and transported for forming the protective film.

The recording then was made at room temperature at a linear velocity of 1.2 m/sec and a recording laser power of 6.0 mW, stored in an atmosphere of the temperature of 70° C. and the relative humidity of 80% and reproduced every 100 hours at a linear velocity of 1.2 m/sec. Then, measurement was made of the BLER (error value per unit time per unit block). The results are shown in FIG. 4.

Figure 4:
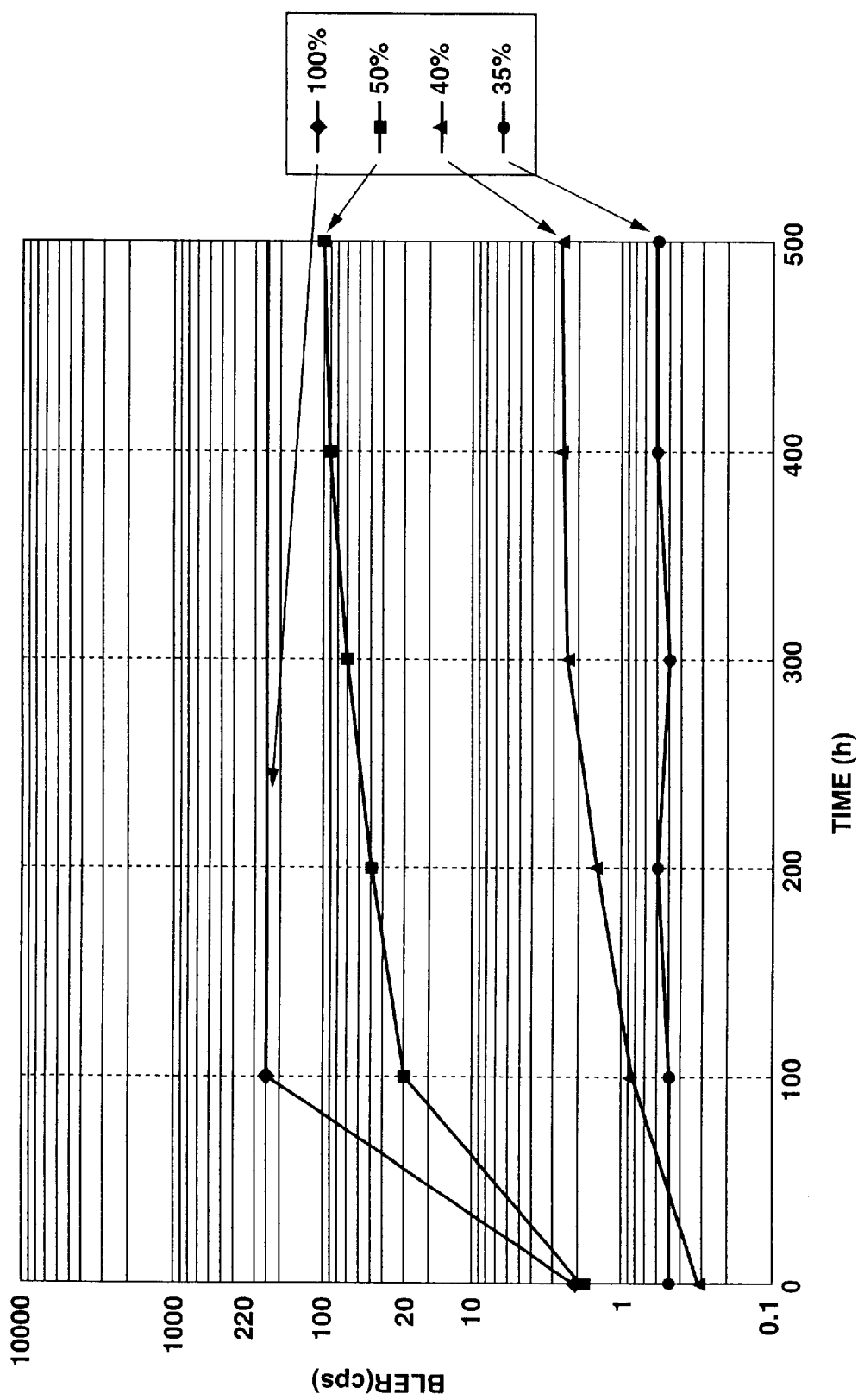
FIG. 4 is a graph showing the storage time when changing the relative humidity in a transporting path after forming a metal film versus the BLER.

It may be seen from FIG. 4 that the humidity in the transporting system strongly influences characteristics of the optical recording medium.

For example, with the relative humidity of 100%, the value of the errors exceeds several hundreds in the first 100 hours. With the relative humidity of 50%, the value of errors is increased with the storage time until the value of the errors produced exceeds 100 in 300 hours.

Conversely, with the relative humidity of 40%, the BLER is not larger than 20 cps even after lapse of 500 hours. With the samples produced in an atmosphere of the relative humidity of 35%, an error is scarcely increased even if the storage time of 500 hours is exceeded.

As may be seen from these test results, high storage reliability is realized in the produced optical recording medium by keeping the atmosphere of the transport path 15 at least after forming the metal film (reflective film) in the relative humidity of 40% or less.

What is claimed is:

1. A method for producing a CD-R optical recording medium, steps in the method being conducted along a transport path, the method comprising:

forming a recording layer by spin coating an organic dyestuff on a substrate;

drying the recording layer using an oven;

forming a reflective film on the recording layer using a sputtering device to form a first stack;

transporting the first stack along the transport path towards a spin coater through an atmosphere having a relative humidity, providing a shielding plate along both sides of the transport path which encloses the transport path at least from the sputtering device to the spin coater, and controls air flow from above the transport path onto the enclosed transport path between the sputtering device and the spin coater;

controlling the relative humidity only in the enclosed transport path such that the relative humidity is not more than 40%; and applying a protective film using the spin coater, to the first stack.

2. The method of claim 1 wherein the recording layer is 1-butyl-2-[5-(1-butyl-3,3-dimethyl benz[e]indolin-2-ylidene)-1,3-pentadienyl]-3,3-dimethyl-1H-benz[e]indolinium dyestuff.

3. The method of claim 1 wherein the reflective film is formed of a material selected from the group consisting of gold, gold alloys, silver, and silver alloys.

4. The method of claim 1 wherein an information recording area is set in the substrate and wherein a wobbling groove as a meandering guide groove is spirally formed by injection molding at least in the information recording area.

5. The method of claim 1 wherein the relative humidity is not more than 35%.

* * * * *